United States Patent [19]
Bürki et al.

[11] Patent Number: 4,754,307
[45] Date of Patent: Jun. 28, 1988

[54] PHOTOGRAPHIC COPYING APPARATUS WITH MASTER FORMAT ADJUSTMENT

[75] Inventors: Peter Bürki, Wettingen; Fred Mast, Wil, both of Switzerland

[73] Assignee: Ciba-Geigy Corporation, Ardsley, N.Y.

[21] Appl. No.: 64,750

[22] Filed: Jun. 22, 1987

[30] Foreign Application Priority Data

Jun. 20, 1986 [CH] Switzerland .......................... 2505/86

[51] Int. Cl.$^4$ ...................... G03B 27/44; G03B 27/54
[52] U.S. Cl. .......................................... 355/46; 355/67
[58] Field of Search .................................... 355/46, 67

[56] References Cited

U.S. PATENT DOCUMENTS 2,270,050 1/1942 Grimson ............................... 355/67
2,425,863 8/1947 Carlson ................................ 355/67

Primary Examiner—Monroe H. Hayes
Attorney, Agent, or Firm—Burns, Doane, Swecker & Mathis

[57] ABSTRACT

In the exposure beam path of a copy master which may have various formats, a four element variable objective is provided with stationary rear and front elements and variable intermediate elements. The rear element is arranged in a carousel-like automatic changer and may be replaced together with a master masks. A control device performs, by means of step motors and spindles, the automatic adjustment of the intermediate elements of the variable objective as a function of a particular master format set, in a manner such that the area of the copy master exposed to the copying light is automatically adapted to the master format.

10 Claims, 1 Drawing Sheet

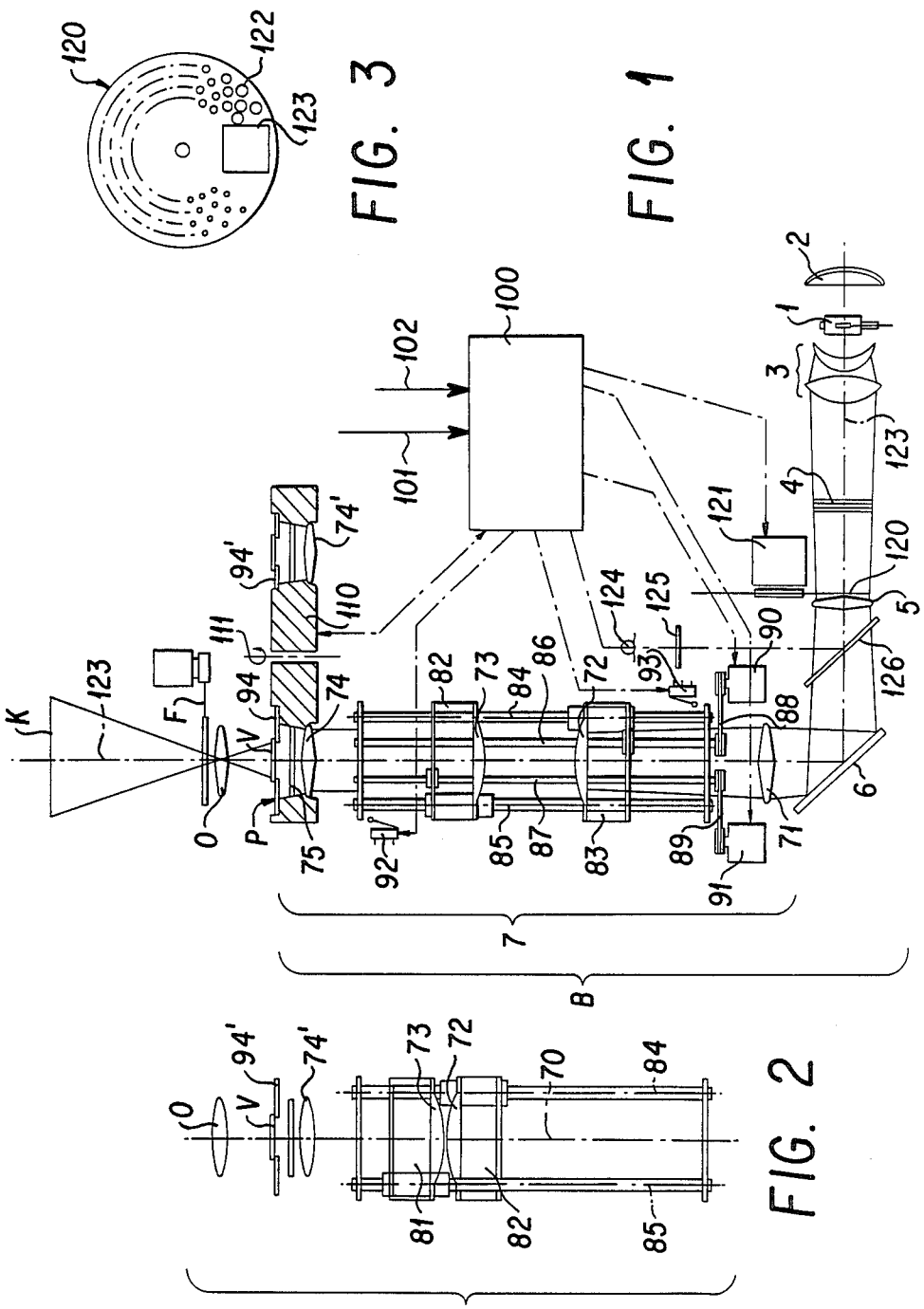

PHOTOGRAPHIC COPYING APPARATUS WITH MASTER FORMAT ADJUSTMENT

BACKGROUND OF THE INVENTION

This invention relates generally to photographic copying apparatus and more particularly to a copying apparatus wherein the area of the copy master exposed to a copying light is automatically adapted to a master format.

Advanced photographic automatic copiers, so-called printers, are in most cases equipped to copy different master formats. For this purpose, they comprise manually or electrically controlled, exchangeable holders for the different copy masters. The holders also include correspondingly dimensioned masks to limit the size of the surface area of the master to be exposed to a copying light. The copying light is usually mixed by means of internally mirrored light shafts in the shape of truncated pyramids, or the like, with their light outlet surface adapted to the size of the mask. If the master format changes, it is also necessary to simultaneously change the mixing shaft or equivalent optical components.

SUMMARY OF THE INVENTION

An object of the present invention is to limit cumbersome processes associated with known devices and provide an improved copying apparatus wherein the change of formats is quick, easy and automatic.

The foregoing object is carried out by providing a photographic copying apparatus with a device for positioning a copy master of a set of different formats. An exposure device is provided for the exposure of the copy master to an exposure light, and a device is provided for imaging the copy master onto a photosensitive copy material. The exposure device comprises a variable exposure objective whereby the area of the surface of the master exposed to the light is automatically adapted to the particular master format set.

BRIEF DESCRIPTION OF THE DRAWING

FIG. 1 is a schematic view illustrating an embodiment of the present invention used with a first format;

FIG. 2 is a schematic view illustrating an embodiment of the present invention used with a second format; and FIG. 3 is a detailed view illustrating an embodiment of a part of the present invention.

DETAILED DESCRIPTION

The copying apparatus of this invention comprises a positioning device or holder P for a copy master V of a set of different formats, an exposure device B for the exposure of the copy master to the copying light and an imaging optics member O to reproduce the copy master V on a light sensitive copy material K. A servo-operated color shutter F is provided in the beam path of the imaging optics member O. To this extent the apparatus corresponds to conventional copying apparatus of this type, for example to the fully automatic, high capacity copier Type 3116, of the present applicant. The difference between the apparatus according to the invention and a conventional copier is found essentially in the improvement of exposure device B which is described in detail below.

The exposure device B comprises a halogen lamp 1, a reflector 2, a two lens condenser 3, a thermal protection (IR) filter 4, a stationary lens 5, a deflecting mirror 6 and a vario-or zoom objective designated 7. The optical layout is such that the condenser 3 is imaged in a stationary input lens 71 of the variable objective 7 and the latter in the plane of the copy master V. The size of the surface exposed to the copy master may be varied arbitrarily by the axial adjustment of two single lens variable elements 72 and 73 of the variable objective 7 and in particular may be adapted to the master format.

The two variable lenses 72 and 73 of the variable objective 7 are mounted in slide-like holders 82 and 83, which in turn are movably supported on two slide rods 84 and 85 in the direction of an objective axis 70. For the movement of the holders 82 and 83 and thus of the lenses 72 and 73, two spindles 86 and 87 are provided to be driven by means of belts 88 and 89 powered by two step motors 90 and 91. Two microswitches 92 and 93 serve to monitor the upper and lower extreme positions (terminal positions) of the holders 82 and 83 and simultaneously define the reference positions for the movement of the lenses 72 and 73.

The variable objective 7 comprises, in addition to the stationary single lens front element 71 and the two variable lenses 72 and 73, a stationary single lens rear element 74 located close to the plane of the copy master V. Between this rear element 74 and the plane of the copy master V, a diffusing disk 75 is located.

The microswitches 92 and 93 and the two step motors 90 and 91 are connected with an electrical control 100 which is receiving, at an inlet 101, information concerning the prevailing format of the master V positioned in the holder P and to be copied, and displaces the two lenses 72 and 73 as a function of a stored position table predetermined by calculation or empirical data, in a manner such that the size of the surface of the copy master V exposed to the copying light corresponds to the format of the master V. The information concerning the master format may be provided by any means, for example by an exposure meter usually associated with such copying devices, or a keyboard or the like.

The positioning device P for the copy master V comprises a master mask 94, combined with the lens 74, to constitute the rear element of the variable objective 7. Mask 94 and lens 74 are located in a carousel like changing device 110 revolving around an axis 111. The changing device 110 also comprises, along its periphery, correlated lens-master mask combination 74', 94', respectively, coordinated with each other, which by the appropriate rotation of the changing device 110 may be introduced selectively in the path 123 of the exposing beam. Associated lens 74 belongs to master mask 94 (corresponding to a certain master format) and a correlated position of the two variable lenses 72 and 73. FIG. 1 illustrates situation for a first, larger master format. FIG. 2 illustrates the layout for a second, smaller master format.

The changing device 110 may be actuated manually or electrically. A coupling connection may further be established between the control 100 (or a computer, not shown) and the changing device 110 in a manner such that, based on the master format chosen, the correct master mask 94 and the associated lens 74 are automatically pivoted into the beam path. Conversely, a sensor may be provided, which is capable of recognizing the mask in active use and which actuates the corresponding setting of the lenses 72 and 73.

In the exposure beam path between the heat protection filter 4 and the stationary lens 5, a light attenuation element in the form of an aperture disk 120 is arranged, which may be brought into any angular position desired by means of a step motor 121 actuated by the control 100. The aperture disk 120 comprises, as shown in FIG. 3, a plurality of holes 122, the total opening cross section of which differs in the circumferential direction from sector to sector, so that the light attenuation effect depends on the rotating (angular) position of the aperture disk 120 eccentrically entering the beam path 123 and may be varied continuously by means of aperture disk 120. A photoreceiver 124 receives, through a diffusing disk 125, the light extracted by a partially permeable mirror 126 located after the stationary lens 5 and serves to regulate the attenuation factor set in cooperation with the control 100. The set value of the light attenuation desired is entered into the control through an inlet 102.

What is claimed is:

1. A photographic copying apparatus comprising:
   means for positioning a copy master of a set of different master formats.
   means for imaging the copy master onto a photosensitive copy material; and
   means for the exposure of the copy master to an exposure light, said means for the exposure including an automatically adjustable variable exposure objective for automatically adapting the area of the copy master exposed to the light with the master format.

2. The apparatus according to claim 1, wherein the exposure objective is electrically adjustable and a control sets the exposure objective in accordance with the master format.

3. The apparatus according to claim 1, wherein the exposure objective comprises, on a side facing the copy master, an adapting element which is optically stationary and movably mounted.

4. The apparatus according to claim 3, including:
   a changing member having several different adapting elements mounted thereon, said adapting elements being pivotable selectively into a beam path of the exposure objective.

5. The apparatus according to claim 4, wherein the changing member also includes different master masks.

6. The apparatus according to claim 5, wherein each adapting element is paired with a master mask.

7. The apparatus according to claim 6, including:
   sensor means provided to recognize the particular master mask located in the beam path, the control setting the variable exposure objective responsive to the sensor.

8. The apparatus according to claim 6, wherein the changing member is electrically driven and is actuated by the control for a desired master format.

9. The apparatus according to claim 1, including:
   an electrically variable light attenuation element.

10. The apparatus according to claim 9, wherein the light attenuation element is an aperture disk having a total aperture varying as a function of angular position.

* * * * *